United States Patent [19]
Goto et al.

[11] Patent Number: 6,048,914
[45] Date of Patent: *Apr. 11, 2000

[54] INK COMPOSITION FOR WRITING INSTRUMENT

[75] Inventors: Kazumi Goto; Shuji Ichikawa, both of Yokohama, Japan

[73] Assignee: Mitsubishi Pencil Kabushiki Kaisha, Tokyo, Japan

[ * ] Notice: This patent is subject to a terminal disclaimer.

[21] Appl. No.: 09/105,231

[22] Filed: Jun. 26, 1998

[30] Foreign Application Priority Data

Jul. 11, 1997 [JP] Japan .................................. 9-186813

[51] Int. Cl.⁷ ............................. C09D 11/16; C09D 11/18
[52] U.S. Cl. ................... 523/161; 106/31.57; 106/31.59; 106/31.85; 106/31.89
[58] Field of Search ..................................... 523/160, 161; 106/31.05, 31.06, 31.13, 31.27, 31.28, 31.32, 31.57, 31.59, 31.6, 31.64, 31.85, 31.89

[56] References Cited

U.S. PATENT DOCUMENTS

| | | | |
|---|---|---|---|
| 4,301,224 | 11/1981 | Kozima et al. | 430/58 |
| 4,657,591 | 4/1987 | Shioi et al. | 106/31.58 |
| 4,664,711 | 5/1987 | Kawaguchi et al. | 524/399 |
| 4,810,738 | 3/1989 | Caridi | 524/317 |
| 5,133,967 | 7/1992 | Smith | 241/401 |
| 5,314,531 | 5/1994 | Huber et al. | 106/31.37 |
| 5,418,277 | 5/1995 | Ma et al. | 524/520 |
| 5,587,408 | 12/1996 | Burns et al. | 523/160 |
| 5,631,317 | 5/1997 | Komatsu et al. | 524/561 |
| 5,763,525 | 6/1998 | Abber et al. | 524/575 |
| 5,868,511 | 2/1999 | Osada | 401/209 |

FOREIGN PATENT DOCUMENTS

| | | |
|---|---|---|
| 5-62630 | 3/1981 | Japan . |
| 62-16233 | 11/1991 | Japan . |
| 7-91502 | 4/1992 | Japan . |
| 62-61239 | 5/1992 | Japan . |

OTHER PUBLICATIONS

Lide, David R.; CRC Handbook of Chemistry and Physics 77th Ed., CRC Press, New York (pp. 15–14 to 15–18), 1996.

Billmeyer, Fred W.; Textbook of Polymer Science 3rd Ed., John Wiley and Sons, New York (pp. 152–153), 1984.

Brandup, J. and Imergut, E.H.; Polymer Handbook 3rd Ed., John Wiley and Sons, New York (pp. VII–551 to VII–557), 1989.

Hoy, K.L. "New Values of the Solubility Parameters from Vapor Pressure Data" Journal of Paint Technology vol. 42, No. 541, (pp. 76–118) Feb., 1970.

Alger, Mark; Polymer Science Dictionary, Chapman and Hall, London (p. 461), 1989.

Lewis Sr., Richard J.; Hawley's Condensed Chemical Dictionary 13th Ed., John Wiley and Sons, New York (p. 909), 1997.

Primary Examiner—Vasu Jagannathan
Assistant Examiner—Callie E. Shosho
Attorney, Agent, or Firm—Darby & Darby

[57] ABSTRACT

An ink composition for writing instruments comprising an organic solvent having an SP value of 5 to 15 and a vapor pressure of 0.01 to 45 mmHg at 20° C., a colorant comprising a pigment and/or a dye, a resin having a solubility of 7% or less in water or ethanol at 25° C. and a fluorinated surfactant, wherein the above ink composition can be used to write on various writing surfaces such as a resin surface, a glass surface and a metal surface, is excellent in a line sticking property against non-absorbing surfaces, a water resistance and an alcohol resistance and can also be used to write certainly even on writing surfaces having a releasing property in a water-repellent property.

4 Claims, No Drawings

INK COMPOSITION FOR WRITING INSTRUMENT

BACKGROUND OF THE INVENTION

1. Field of the Invention

The present invention relates to an ink composition for writing instrument which can write on various writing surfaces such as a resin surface, a glass surface, a metal surface, etc., is excellent in a line sticking property to non-absorption surfaces, a water resistance and an alcohol resistance which can certainly write on said surfaces even if these writing surfaces have a releasing property and a water repellency, and which is useful as, for example, marking pens, sign pens and ball point pens.

2. Description of the Prior Art

Inks used for conventional oil base sign pens and the like contain xylene, cellosolve and ketones as principal solvents, and therefore an adverse effect to a human body is concerned. Further, there is a problem that they have an inferior alcohol resistance and the drawn lines thereof are erased with an alcohol in a certain case.

Inks using alcohols such as ethanol as a principal solvent have a problem that they have no fastness and a low sticking property against a non-absorbing surface, and further have a problem that they have a poor alcohol resistance and the drawn lines thereof are easily erased with alcohol. In addition, they have the restriction as well that they can not write on writing surfaces such as a resin surface, a glass surface and a metal surface.

On the other hand, an ink composition comprising a) a resin selected from the group consisting of an alkylphenol resin, a phenol-modified xylene resin and a phenol-terpene resin all of which are soluble in aliphatic hydrocarbon and/or alicyclic hydrocarbon solvents, b) a medium viscosity and/or high viscosity silicone oil which is soluble in aliphatic hydrocarbon and/or alicyclic hydrocarbon solvents and which is non-volatile and has a viscosity of 100 to 1,000,000 cs at 25° C., c) a pigment and/or an oil soluble dye, d) an aliphatic hydrocarbon and/or alicyclic hydrocarbon solvent and e) a low viscosity silicone oil having a boiling point of 80 to 160° C. and a viscosity of 1.5 cs or less at 25° C. is disclosed in Japanese Patent Publication No. Hei 5-62630 as an ink composition which can write on water-repellent materials such as adhesive tapes, paraffin paper, released paper and the like and provides a good leveling property even when writing on non-osmotic surfaces such as plastics, ceramics and metals.

Further, an oil base ink prepared by adding only a silicone base adhesive comprising a resin component and an oil or a gum component as film-forming resins to a colorant and a solvent is disclosed in Japanese Patent Publication No. Hei 7-91502 as an oil base ink composition which has an excellent adhesion against surfaces of materials having a low surface tension and a bad wetting property such as a kraft tape for packaging.

The ink compositions for writing instruments disclosed in these publications can write on water-repellent materials such as adhesive tapes, paraffin paper and released paper having a bad wetting property as compared with conventional ink compositions for writing instruments and provide good leveling properties even when writing on non-osmotic surfaces such as plastics, ceramics and metals. However, there are problems that the drawn lines are not yet sufficiently high in a drying property and a sticking property and are easily erased with solvents such as alcohol. In particular, when important documents are written therewith, there is a concern that matters written with existing ink compositions for writing instruments might be altered, and therefore ink compositions for writing instruments providing drawn lines which are not erased with solvents and are not altered are desired.

On the other hand, a marking ink composition prepared by adding a mixture of a reactive linear silicone polymer and a branched silicone polymer to a marking ink is disclosed in Japanese Patent Publication No. Sho 62-16233 as a marking ink composition for marking on surfaces of various molded articles containing silicone or fluorinated resins.

Further, an oil base ink comprising a colorant, a synthetic resin, a fluorinated surfactant, a silane coupling agent and a solvent is disclosed in Japanese Patent Publication No. Sho 62-61239 as an oil base ink having a good adhesion even on a surface of a material having a markedly low surface tension and an inferior wetting property without showing a cissing phenomenon.

However, in the case of the marking ink composition disclosed in former Japanese Patent Publication No. Sho 62-16233 described above, marking is provided on surfaces of various molded articles containing fluorinated resins, and then the marking parts are cured by heating. Thus, it has a different use as an ink for writing instruments from that of the present invention and is different as well in a technical idea from the present invention.

Further, the oil base ink disclosed in latter Japanese Patent Publication No. Sho 62-61239 described above is similar to the ink composition of the present invention in terms of using fluorinated surfactants, but the above oil base ink is intended for making it possible to write on materials such as a gum tape for packaging which is covered on a surface thereof with a silicone coat without showing a cissing phenomenon, and therefore, there are problems that the drawn lines are not yet sufficiently high in a drying property and a sticking property and are easily erased with solvents such as alcohol. In particular, when important documents are written therewith, there is a concern that matters written therewith might be altered. Further, a synthetic resin and a solvent blended in this oil base ink have so far been used for conventional inks for writing instruments and are different in a use purpose and physical properties from the resin and the organic solvent used in the present invention. Thus, the above oil base ink has a different technical idea from that of the present invention from the viewpoint of the resin and the organic solvent.

SUMMARY OF THE INVENTION

In order to solve such problems on conventional techniques, it is an object of the present invention to provide an ink composition used for writing instruments, which can write on non-absorption surfaces such as a resin surface, a glass surface and a metal surface and is excellent in a drawn line sticking property, a water resistance and an alcohol resistance and which provides drawn lines which are not erased with solvents and therefore can not be altered and makes it possible to write even on surfaces having a releasing property or a repellent property.

Intensive investigations on the preceding problems of conventional techniques continued by the present inventors have resulted in successfully obtaining an ink composition used for writing instruments, which is the object described above, by containing a solvent having specific physical properties and a specific ink composition, and accomplished the present invention.

That is, the ink composition of the present invention comprises the following constitutions (1) to (16):

(1) An ink composition for writing instruments, which comprises an organic solvent having an SP value of 5 to 15 and a vapor pressure of 0.01 to 45 mmHg at 20° C., a colorant consisting a pigment and/or a dye, a resin having a solubility of 7% or less in water or ethanol at 25° C. and a fluorinated surfactant.

(2) The ink composition for writing instruments according to mentioned above (1), wherein said organic solvent is at least one selected from the group consisting of glycol ethers, glycol ether acetates, esters and derivatives thereof.

(3) The ink composition for writing instruments according to mentioned above (1), wherein said resin having a solubility of 7% or less in water or ethanol is at least one selected from the group consisting of a vinyl resin and a modified vinyl resin thereof, an acrylic resin and a fluorinated resin.

(4) The ink composition for writing instruments according to mentioned above (2), wherein said resin having a solubility of 7% or less in water or ethanol is at least one selected from the group consisting of a vinyl resin and a modified vinyl resin thereof, an acrylic resin and a fluorinated resin.

(5) The ink composition for writing instruments according to mentioned above (1), wherein said fluorinated surfactant is at least one selected from the group consisting of surfactants having perfluoroalkyl groups or fluorinated alkyl groups and oligomers thereof.

(6) The ink composition for writing instruments according to mentioned above (2), wherein said fluorinated surfactant is at least one selected from the group consisting of surfactants having perfluoroalkyl groups or fluorinated alkyl groups and oligomers thereof.

(7) The ink composition for writing instruments according to mentioned above (3), wherein said fluorinated surfactant is at least one selected from the group consisting of surfactants having perfluoroalkyl groups or fluorinated alkyl groups and oligomers thereof.

(8) The ink composition for writing instruments according to mentioned above (4), wherein said fluorinated surfactant is at least one selected from the group consisting of surfactants having perfluoroalkyl groups or fluorinated alkyl groups and oligomers thereof.

(9) The ink composition for writing instruments according to mentioned above (1), wherein the ink has a viscosity of 1 to 60 mPa·s and a surface tension of 13 to 40 dyn/cm.

(10) The ink composition for writing instruments according to mentioned above (2), wherein the ink has a viscosity of 1 to 60 mPa·s and a surface tension of 13 to 40 dyn/cm.

(11) The ink composition for writing instruments according to mentioned above (3), wherein the ink has a viscosity of 1 to 60 mPa·s and a surface tension of 13 to 40 dyn/cm.

(12) The ink composition for writing instruments according to mentioned above (4), wherein the ink has a viscosity of 1 to 60 mPa·s and a surface tension of 13 to 40 dyn/cm.

(13) The ink composition for writing instruments according to mentioned above (5), wherein the ink has a viscosity of 1 to 60 mPa·s and a surface tension of 13 to 40 dyn/cm.

(14) The ink composition for writing instruments according to mentioned above (6), wherein the ink has a viscosity of 1 to 60 mPa·s and a surface tension of 13 to 40 dyn/cm.

(15) The ink composition for writing instruments according to mentioned above (7), wherein the ink has a viscosity of 1 to 60 mPa·s and a surface tension of 13 to 40 dyn/cm.

(16) The ink composition for writing instruments according to mentioned above (8), wherein the ink has a viscosity of 1 to 60 mPa·s and a surface tension of 13 to 40 dyn/cm.

DETAILED DESCRIPTION OF THE PREFERRED EMBODIMENT

Explained in detail below is the embodiment of the present invention.

An ink composition for writing instruments of the present invention comprises an organic solvent having a SP value of 5 to 15 and vapor pressure of 0.01 to 45 mmHg at 20° C., a colorant consisting of a pigment and/or a dye, a dispersing resin having a solubility of 7% or less in water and ethanol at 25° C. when said colorant is a pigment, a sticking resin having a solubility of 1% or less in water and ethanol at 25° C. when said colorant is a dye, and a fluorinated surfactant.

The organic solvent used in the present invention has to have a SP value of 5 to 15, preferably 7 to 13, and a vapor pressure of 0.01 to 45 mmHg, preferably 0.05 to 20.0 mmHg.

The SP (solubility parameter) value ($\delta$) of the organic solvent is restricted from a viewpoint of materials which can be dissolved in the ink. If the SP value is less than 5, the solvent and functional groups of the resin which are used in the ink are reduced, and the sticking property is lowered. On the other hand, if the SP value exceeds 15, the solvent has an increased polarity, and the resin for use in the ink includes resins which are easy to be dissolved in ethanol, therefore such values are not preferred.

The SP value [solubility parameter ($\delta$)] prescribed in the present invention is shown as a scale for a mixing property between the respective components in mixing and dissolving them, and the dissolution is expressed as follows:

If the heat balance is considered based on the assumption that when two components, a component I and a component II, are dissolved, the bonds of I-I and II-II are changed to I-II between the respective molecules, then to release the respective molecules from an inter-molecular force surrounding them means vaporization thereof, and therefore a change in an internal energy in mixing the vaporized components and condensing them as they are is shown by the following equation:

$$\Delta E = \Delta E_1 + \Delta E_2 - 2(\Delta E_1 \cdot \Delta E_2)^{0.5}$$

$$\Delta E = [(\Delta E_1)^{0.5} - (\Delta E_2)^{0.5}]^2$$

[$\Delta E_1$: internal energy change when vaporizing the component I $\Delta E_2$: internal energy change when vaporizing the component II $(\Delta E_1 \cdot \Delta E_2)^{0.5}$: energy recovered by bond energy produced between the components I and II]

That is, the smaller the $[(\Delta E_1)^{0.5} - (\Delta E_2)^{0.5}]$ is, the smaller the enthalpy change $\Delta H$ is, and the more the dissolution is facilitated. $\Delta E$ per unit volume of each component, which is called a condensing energy, has a relation of $\Delta H = \Delta E + RT$ with an enthalpy $\Delta H_v$ in vaporization, and therefore $\Delta H$ is determined from a temperature dependence of a vapor pressure according to the Clausius-Clapeyron, whereby $\Delta E$ can be known.

Here, a square root of a condensing energy density is called a solubility parameter and shown by the following equation:

$$\delta = (\Delta E/V)^{0.5}$$

[$\Delta E$: molecular condensing energy (cal/mol), V: molecular volume (ml/mol)]

Various methods for determining it are available, and a little different values are obtained depending on the determining methods and the calculating methods thereof. Known as the specific examples thereof are a vaporization latent heat method (Hildebrand method), a vapor pressure method (Hoy method), a dissolution method, a swelling method, a surface tension method, a critical pressure method, a thermal expansion coefficient method and a molecular attracting force constant method. In the present invention, the value obtained by the vaporization latent heat method is employed.

If the vapor pressure (20° C.) of the organic solvent is less than 0.01 mmHg, the drying property is deteriorated in drawing lines in the form of an ink, and therefore it not peferred. On the other hand, neither is the vapor pressure (20° C.) exceeding 45 mmHg preferred in terms of a product performance since marked dry-up is observed at the pen tip and the writing performance is affected to a large extent.

The intended dispersion of the pigment and the intended line sticking property (fastness) of the drawn lines can be achieved by using the organic solvent falling in a range of the SP value (δ) described above. Further, the quick drying property can be displayed by using the organic solvent falling in a range of the vapor pressure (20° C.) [p] described above. Thus, lines drawn on non-osmotic surfaces such as an adhesive tape, paraffin paper, plastics, ceramics and metal each of which has a bad wetting property are quickly fixed.

The organic solvent used in the present invention is not specifically limited as long as it is an organic solvent falling in the range of the SP values and the vapor pressures (20° C.) described above. It is preferably at least one selected from the group consisting of glycol ethers, glycol ether acetates, esters and derivatives thereof from the viewpoints of a cost, safety and handling.

Glycol ethers and derivatives thereof include, for example, ethylene glycol monomethyl ether, ethylene glycol monoethyl ether, ethylene glycol monopropyl ether, ethylene glycol monobutyl ether, ethylene glycol monohexyl ether, ethylene glycol mono-2-ethylhexyl ether, ethylene glycol dimethyl ether, ethylene glycol dibutyl ether, diethylene glycol monomethyl ether, diethylene glycol monoethyl ether, diethylene glycol monopropyl ether, diethylene glycol monobutyl ether, diethylene glycol dimethyl ether, diethylene glycol diethyl ether, diethylene glycol dibutyl ether, triethylene glycol dimethyl ether, tetraethylene glycol dimethyl ether, propylene glycol monomethyl ether, propylene glycol monopropyl ether, propylene glycol monobutyl ether, propylene glycol mono-t-butyl ether, dipropylene glycol monomethyl ether, dipropylene glycol monobutyl ether, tripropylene glycol monomethyl ether, tripropylene glycol monobutyl ether, propylene glycol monophenyl ether, triethylene glycol monobutyl ether, tetraethylene glycol monobutyl ether, ethylene glycol monophenyl ether, ethylene glycol mono-2-ethylbutyl ether, propylene glycol monoethyl ether, 3-methyl-3-methoxy-1-butanol, diethylene glycol methylethyl ether, diethylene glycol monohexyl ether and diethylene glycol monoethylhexyl ether.

Glycol ether acetates and derivatives thereof include, for example, ethylene glycol methyl ether acetate, ethylene glycol ethyl ether acetate, ethylene glycol butyl ether acetate, ethylene glycol diacetate, diethylene glycol ethyl ether acetate, diethylene glycol butyl ether acetate, propylene glycol methyl ether acetate, propylene glycol diacetate, dipropylene glycol methyl ether acetate, 3-methyl-3-methoxybutyl acetate, propylene glycol ethyl ether acetate and 3-methoxybutyl acetate.

Esters include, for example, ethyl acetate, n-propyl acetate, isopropyl acetate, n-butyl acetate, isobutyl acetate, n-amyl acetate, isoamyl acetate, hexyl acetate, 2-methylpentyl acetate, 1-methylamyl acetate, heptyl acetate, octyl acetate, 2-ethylhexyl acetate, nonyl acetate, decyl acetate, n-methyl acetate, isobutyl isobutyrate, methyl caproate, ethyl caproate, ethyl caprylate, ethyl lactate, n-butyl lactate, diethyl succinate and ethyl 3-methoxypropionate.

These organic solvents can be used alone or as a mixture of two or more kinds thereof. The organic solvents other than ethylene glycol derivatives are more preferably used in terms of safety and oral toxicity.

The blending amount of the organic solvent used in the present invention satisfying the conditions described above is varied depending on whether they are used alone or in a mixture of two or more kinds thereof and is 20 to 97% by weight, preferably 30 to 93% by weight based on the whole amount of the ink composition.

If the blending amount of the organic solvent is less than 20% by weight, the ink has a poor fluidity, and the blending amount exceeding 97% by weight leads to a reduction in the proportions of the additives of the colorant, the resin and others and exerts a large influence on the quality of the product, therefore the both cases are not preferred.

The colorant used in the present invention includes pigments and/or dyes. Dyes having a low solubility in water or ethanol are preferred.

Organic pigments and inorganic pigments can be used as the pigment, and those which are hard to dissolve in the organic solvents to be used are preferred. In the case of the organic pigments, those having an average particle diameter of 30 to 700 nm after the dispersion are preferred, and in the case of the inorganic pigments, those having an average particle diameter of 30 to 10 nm after the dispersion are preferred.

The dyes used in the present invention is not specifically limited as long as they have a low solubility in water or ethanol as described above. Included are those having a solubility of 10% or less in water or ethanol at room temperature and a solubility of 3% or more in the principal solvent at room temperature. Further, the dyes and the pigments may be used in combination as long as the stability is not deteriorated in such a way that the pigments settle down and the viscosity increases.

The blending amount of the pigment is 0.5 to 25% by weight, preferably 0.5 to 20% by weight based on the whole amount of the ink composition, and the blending amount of the dye is 0.1 to 35% by weight, preferably 0.5 to 20% by weight based on the whole amount of the ink composition. They can be blended within the ranges described above, if necessary.

The inorganic pigments used in the present invention include, for example, carbon black, titanium black, zinc oxide, red iron oxide, titanium oxide, chromium oxide, black iron oxide, cobalt blue, yellow iron oxide, viridian, zinc sulfide, lithopone, cadmium yellow, vermilion, cadmium red, chrome yellow, molybdate orange, zinc chromate, strontium chromate, white carbon, clay, talc, ultramarine, precipitated barium sulfate, barite powder, calcium carbonate, white lead, Prussian blue, manganese violet, aluminum powder and brass powder.

The organic pigments used in the present invention include anilines, cyanines, azos (monoazo type and diazo type), phthalocyanines and azines. They can be used alone or as a mixture of two or more kinds thereof. Specific examples thereof include yellow organic pigments such as hanza yellow and benzidine yellow, orange organic pigments such as benzidine orange and permanent orange, red organic pigments such as lake red and permanent carmine, purple organic pigments such as quinacridone violet and dioxazine violet, blue organic pigments such as phthalocyanine blue and fast sky blue, green organic pigments such as phthalocyanine green, and permanent brown.

Further, included are organic multiple color pigments comprising resin emulsions obtained by polymerizing monomers such as styrene, acrylic acid, acrylates, methacrylic acid, methacrylates, acrylonitrile and olefin type monomers, hollow resin emulsions which are swollen in an ink to become amorphous, or dyed resin particles obtained by dyeing these emulsions with colorants.

The dyes which are soluble in the organic solvents described above and suited to the present invention include, for example, C. I. solvent black 3, C. I. solvent black 5, C. I. solvent black 7, C. I. solvent black 27, C. I. solvent black 29, C. I. solvent black 34, C. I. solvent yellow 2, C. I. solvent yellow 14, C. I. solvent yellow 16, C. I. solvent yellow 29, C. I. solvent yellow 33, C. I. solvent yellow 56, C. I. solvent yellow 77, C. I. solvent yellow 79, C. I. solvent yellow 82, C. I. solvent yellow 93, C. I. solvent red 1, C. I. solvent red 3, C. I. solvent red 4, C. I. solvent red 8, C. I. solvent red 18, C. I. solvent red 24, C. I. solvent red 27, C. I. solvent red 49, C. I. solvent red 111, C. I. solvent red 132, C. I. solvent red 135, C. I. solvent red 179, C. I. solvent red 218, C. I. solvent blue 14, C. I. solvent blue 25, C. I. solvent blue 35, C. I. solvent blue 70, C. I. solvent blue 94, Basic blue 7, C. I. solvent orange 45, C. I. solvent orange 60, C. I. solvent orange 62, C. I. solvent green 3, C. I. solvent violet 8, C. I. solvent violet 13, C. I. solvent violet 14 and C. I. solvent brown 5. In addition thereto, derivatives thereof and salts of dyes having a water resistance are included.

The resins used in the present invention have different characteristics depending on the colorants used. When the colorant is the pigment, the resin can be used for a dispersant or a dispersant and sticking agent and can be dissolved in the organic solvents described above. The resin in turn can disperse the pigment. On the other hand, when the colorant is the dye, the resin is blended as a sticking agent.

In the present invention, when the colorant is a pigment alone, at least one of the dispersing resins or the dispersing and sticking resins having a solubility of 7% or less in water or ethanol at 25° C. is used, and the sticking resin can further be added depending on the performance of the ink. When the colorant is a dye alone, the sticking resins having a solubility of 1% or less in water or ethanol at 25° C. are used. Further, when the colorant is a pigment used in combination with a dye, at least one of the dispersing resins or the dispersing and sticking resins having a solubility of 7% or less in water or ethanol at 25° C. is used, and the sticking resin is further used depending on the performance of the ink. The use of the resins satisfying these conditions makes it possible to display a stability of the ink, a water resistance and an alcohol resistance of the drawn lines, and a sticking property (fastness) of the drawn lines.

If the dispersing resin having a solubility exceeding 7% in water or ethanol at 25° C. and the sticking resin having a solubility exceeding 1% are used, a water resistance and an alcohol resistance of the drawn lines are deteriorated, and a density of the colorant relative to water or alcohol is lowered or disappears, therefore the both cases are not preferred.

The dispersing resins used in the present invention are require to have a solubility of 7% or less in water or and ethanol at 25° C. and are not specifically limited as long as the resins have preferably a solubility of 3% or less, more preferably 1% or less. Further, the sticking resins are required to have a solubility of 1% or less in water or ethanol at 25° C.

Resins satisfying these physical properties include, for example, vinyl resins and modified vinyl resins thereof such as vinyl chloride-vinyl acetate copolymers, hydroxyl-modified vinyl chloride-vinyl acetate copolymers and carboxyl-modified vinyl chloride-vinyl acetate copolymers, acrylic resins comprising as principal components homopolymers and copolymers of esters of methacrylic acid and acrylic acid, or acrylic type resins such as polymers using specific acrylic monomers using derivatives thereof, fluorinated resins such as copolymer resins comprising fluoroolefins and plural alkyl vinyl ethers [for example, a trade name "Lumiflon" (manufactured by Asahi Glass Co., Ltd.) and trade names "Fluonate K-702 and K-705" (manufactured by DAINIPPON INK AND CHEMICALS, INC.)], and other resins such as rosin-modified maleic acid resins and rosin-modified phenol resins which can be used if they have a low acid value [for example, a trade name "Beccacite" (manufactured by DAINIPPON INK AND CHEMICALS, INC.)].

Further, other resins falling in the range of a solubility required for the resin used in the present invention include, for example, trade names "Solsparce 24,000SC", "Solsparce 24,000GR", "Solsparce 26,000" and "Solsparce 28,000" [manufactured by Geneca Co., Ltd. (formerly manufactured by ZENECA K. K.).

Further, resins other than those described above can be used without being specifically limited as long as they fall in a range of the physical properties described above and exerts a bad influence on a stability of the ink.

The blending amount of these resins can be selected from a range of at least 1% by weight or more, and preferably 1 to 15% by weight.

Incidentally, in the resins described above, the resins produced by a solution polymerization method, for example, acrylic resins and Lumiflon, are available in the form of 30 to 70% by weight solutions of organic solvents (for example, ethyl acetate, butyl acetate, toluene and the like). Accordingly, solid matters of these resins were once precipitated, dried and then used after confirming solubilities thereof in water or ethanol.

The fluorinated surfactants used in the present invention include at least one selected from the group consisting of, for example, surfactants having perfluoroalkyl groups or fluorinated alkyl groups or oligomers thereof. To be specific, included are perfluoroalkylalkoxylates [a trade name "FC-171" (manufactured by SUMITOMO 3M LTD.)], fluorinated alkyl esters [trade names "FC-430" and "FC-431" (manufactured by SUMITOMO 3M LTD.)], perfluoroalkyl-containing oligomers [trade names "S-381", "S-383", "S-393", "SC-101" and "SC-105" (manufactured by Asahi Glass Co., Ltd.)], perfluoroalkyl ethylene oxide adducts [a trade name "KH-40" (manufactured by Asahi Glass Co., Ltd.)], perfluoroalkyl-containing specific blend products [a trade name "SA-100" (manufactured by Asahi Glass Co., Ltd.)], perfluoroalkyl group·hydrophilic group-containing oligomers [a trade name "F-171" (manufactured by DAINIPPON INK AND CHEMICALS, INC.)], perfluoroalkyl group·lipophilic group-containing oligomers [trade names "F-172" and "F-173" (manufactured by DAINIPPON INK AND CHEMICALS, INC.)], perfluoroalkyl group· (hydrophilic group·lipophilic group)-containing oligomers [a trade name "F-177" (manufactured by DAINIPPON INK AND CHEMICALS, INC.)], perfluoroalkyl group-containing oligomers [trade names "F-178A", "F-178K" and "F-179" (manufactured by DAINIPPON INK AND CHEMICALS, INC.)], perfluoroalkyl group·lipophilic group-containing urethanes [trade names "F-183" and "F-184" (manufactured by DAINIPPON INK AND CHEMICALS, INC.)], perfluoroalkyl group·lipophilic group-containing oligomers [trade names "EF-801" and "EF-351" (manufactured by MITSUBISHI MATERIALS CO.)] and perfluoroalkyl group·hydrophilic group-containing oligomers [trade names "EF-802" and "EF-352" (manufactured by MITSUBISHI MATERIALS Co.)]. They can be used alone or as a mixture of two or more kinds thereof.

The blending amount of these fluorinated surfactants is 0.01 to 15% by weight, preferably 0.1 to 7% by weight based on the whole amount of the ink composition. If the blending amount of the fluorinated surfactants is less than 0.01 by weight, the effect relative to a stamping surface having a releasing property or a water-repellent property is extremely reduced. On the other hand, the blending amount exceeding 15% by weight causes a reduction in the ink viscosity, the ink stability and the drying property in stamping and therefore the both cases are not preferred.

In the present invention, can be blended are, if necessary, preservatives, fungicides, surfactants, rust preventives, lubricants and wetting agents which can be used without exerting adverse effects on the other dispersants and dispersion aids and the ink. Further, auxiliary solvents can be blended as well in terms of a product quality as long as they do not damage a stability of the ink.

Also, non-volatile solvents (for example, castor oil-modified solvent) miscible with the principal solvent can be added as an auxiliary solvent for controlling drying in terms of the product characteristics to such an extent that they do not exert adverse effects.

The preservatives or the fungicides include, for example, phenol, sodium omazine, sodium pentachlorophenol, 1,2-benzisothiazoline-3-one, 2,3,5,6-tetrachloro-4-(methylsulfonyl)pyridine, alkaline metal salts of benzoic acid, sorbic acid and dehydroacetic acid such as sodium benzoate, and benzimidazole compounds.

The rust preventives include, for example, benzotriazole, dicyclohexylammonium nitrite, diisopropylammonium nitrite and tolyl triazole.

The lubricants and the wetting agents include, for example, polyether-modified silicones such as polyethylene glycol adducts of dimethylpolysiloxane.

Further, additives other than these compounds can be blended as long as they do not exert adverse effects on the intended ink composition.

An ink viscosity of the ink composition for writing instruments of the present invention has to be 1 to 60 mPa.s and is suitably adjusted within the viscosity range described above depending on uses of writing instruments.

The ink viscosity can be set to 3 to 10 mPa.s in the case of pen-shaped writing instruments using an inner cotton as an ink reservoir, 10 to 35 mPa.s in the case of pen-shaped writing instruments equipped with a controller driven by a valve of a pumping type using no inner cotton and 10 to 55 mPa.s In the case of specific valve-shaped writing instruments of a body knockout type.

The ink reserved in a writing instrument can be transferred on a writing surface by controlling the viscosity to the ranges described above. The viscosity of less than 1 mPa.s makes it impossible to control the flow amount of the ink and exerts an adverse effect on the drawn lines due to the excess ink. On the other hand, the viscosity exceeding 60 mPa.s reduces the flow amount of the ink to provide the drawn lines with poor sharpness, therefore the both cases are not preferred.

Further, the ink composition of the present invention for writing instruments has to have an ink surface tension of 13 to 40 dyn/cm, preferably 14 to 30 dyn/cm. The surface tension of the ink of less than 13 dyn/cm causes problems of feathering and leakage (sagging of the ink) from the discharge mechanism (pen lead). On the other hand, the surface tension thereof exceeding 40 dyn/cm prevents the solvent from dissolving the components for the ink composition, therefore the both cases are not preferred.

Various methods which have so far been known can be employed for producing the ink compositions for writing instruments of the present invention. The ink composition of the prese nt invention can readily be obtained, for example, by mixing the respective components described above and mixing them by means of a stirrer such as a dissolver or mixing and crushing the components by means of a ball mill, three rolls, a beads mill or a sand mill and then removing coarse particles of pigment particles and titanium oxide particles, undissolved matters and contaminated solid matters by centrifugation or filtration.

EXAMPLES

Next, the present invention is explained in more details with reference to Examples and Comparative Examples. The present invention is by no means limited by these Examples.

Examples 1 to 14 and Comparative Examples 1 to 10

Organic solvents and resins each of which has the physical properties described in the following Table 1 and Table 2 were used to stir the following respective blend contents (components) and then filter the blended components, whereby ink compositions for writing instruments were prepared. Hereinafter, "%" means % by weight, and a vinyl chloride-vinyl acetate copolymer is abbreviated as "VCA".

| Example 1 | | |
|---|---|---|
| Solvent: | ① propylene glycol ethyl ether acetate | 88.8% |
| Colorant: | insoluble azo pigment Symuler Fast Red-4127 (manufactured by DAINIPPON INK AND CHEMICALS, INC.) | 5.0% |
| Resin: | ① hydroxy-modified VCA VROH (manufactured by UCC Co., Ltd.) | 5.0% |
| Fluorinated surfactant: | perfluoroalkyl group.hydrophilic group-containing oligomer EF-352 (manufactured by MITSUBISHI MATERIALS CO.) | 1.2% |
| Example 2 | | |
| Solvent: | ① propylene glycol methyl ether acetate | 89.0% |
| Colorant: | carbon black #44 (manufactured by Mitsubishi Chemical Co.) | 3.0% |
| Resin: | ① carboxyl-modified VCA VMCH (manufactured by UCC Co., Ltd.) | 3.0% |
| Fluorinated surfactant: | perfluoroalkyl group-containing oligomer SC-101 (manufactured by Asahi Glass Co., Ltd.) | 5.0% |
| Example 3 | | |
| Solvent: | ① dipropylene glycol monomethyl ether | 25.0% |
| | ② 3-methyl-3-methoxybutyl acetate | 57.3% |
| Colorant: | insoluble azo pigment Symuler Fast Red-4127 (manufactured by DAINIPPON INK AND CHEMICALS, INC.) | 10.0% |

-continued

| Resin: | ① hydroxy-modified VCA VROH (manufactured by UCC Co., Ltd.) | 5.0% |
| --- | --- | --- |
| Fluorinated surfactant: | perfluoroalkyl group.lipophilic group-containing oligomer EF-351 (manufactured by MITSUBISHI MATERIALS CO.) | 2.7% |

Example 4

| Solvent: | ① propylene glycol methyl ether acetate | 89.5% |
| --- | --- | --- |
| Colorant: | phthalocyanine pigment Fastogen Blue NK (manufactured by DAINIPPON INK AND CHEMICALS, INC.) | 4.0% |
| Resin: | ① hydroxy-modified VCA VYES (manufactured by UCC Co., Ltd.) | 3.0% |
| Fluorinated surfactant: | perfluoroalkyl group-containing oligomer SC-101 (manufactured by Asahi Glass Co., Ltd.) | 3.5% |

Example 5

| Solvent: | ① propylene glycol methyl ether acetate | 58.0% |
| --- | --- | --- |
| | ② propylene glycol monobutyl ether | 34.5% |
| Colorant: | phthalocyanine pigment Fastogen Blue NK (manufactured by DAINIPPON INK AND CHEMICALS INC.) | 3.0% |
| Colorant: | dye Spilon Blue #2BNH (manufactured by HODOGAYA CHEMICAL CO., LTD.) | 1.0% |
| Resin: | ① hydroxy-modified VCA VYES (manufactured by UCC Co., Ltd.) | 1.5% |
| Fluorinated surfactant: | perfluoroalkyl group.hydrophilic group-containing oligomer EF-352 (manufactured by MITSUBISHI MATERIALS CO.) | 2.0% |

Example 6

| Solvent: | ① propylene glycol methyl ether acetate | 90.0% |
| --- | --- | --- |
| Colorant: | insoluble azo pigment Symuler Fast Red-40152 (manufactured by DAINIPPON INK AND CHEMICALS, INC.) | 4.0% |
| Resin: | ① carboxyl-modified VCA VMCH (manufactured by UCC Co., Ltd.) | 3.0% |
| Fluorinated surfactant: | perfluoroalkyl group.lipophilic group-containing oligomer EF-351 (manufactured by MITSUBISHI MATERIALS CO.) | 3.0% |

Example 7

| Solvent: | ① propylene glycol methyl ether acetate | 93.0% |
| --- | --- | --- |
| Colorant: | insoluble azo pigment Symuler Fast Red-4081 (manufactured by DAINIPPON INK CHEMICALS, INC.) | 3.0% |
| Resin: | ① acrylic resin MM-401-1 (manufactured by Fujikura Kasei Co., Ltd.) | 2.0% |
| Fluorinated surfactant: | perfluoroalkyl group-containing oligomer SC-105 (manufactured by Asahi Glass Co., Ltd.) | 2.0% |

Example 8

| Solvent: | ① dipropylene glycol monomethyl ether | 90.0% |
| --- | --- | --- |
| Colorant: | insoluble azo pigment Fastogen Red YE (manufactured by DAINIPPON INK AND CHEMICALS, INC.) | 5.0% |
| Resin: | ① fluorinated resin Lumiflon (LM-400) (manufactured by Asahi Glass Co., Ltd.) | 5.0% |
| Fluorinated surfactant: | perfluoroalkyl group.hydrophilic group-containing oligomer EF-802 (manufactured by MITSUBISHI MATERIALS CO.) | 1.5% |

| | perfluoroalkyl group.hydrophilic group-containing oligomer EF-352 (manufactured by MITSUBISHI MATERIALS CO.) | 1.5% |
| --- | --- | --- |

Example 9

| Solvent: | ① propylene glycol methyl ether acetate | 68.5% |
| --- | --- | --- |
| | ② 3-methyl-3-methoxybutyl acetate | 10.5% |
| Colorant: | quinacridone pigment Fastogen Super Magenta RTS (manufactured by DAINIPPON INK AND CHEMICALS, INC.) | 11.5% |
| Resin: | ① Solsparce 24,000 SC (manufactured by ZENECA K.K.) | 9.0% |
| Fluorinated surfactant: | perfluoroalkyl group.lipophilic group-containing oligomer EF-351 (manufactured by MITSUBISHI MATERIALS CO.) | 0.5% |

Example 10

| Solvent: | ① propylene glycol monophenyl ether | 30.0% |
| --- | --- | --- |
| | ② propylene glycol monobutyl ether | 39.0% |
| | ③ propylene glycol monomethyl ether | 24.0% |
| Colorant: | dye Spilon Blue #2BNH (manufactured by HODOGAYA CHEMICAL CO., LTD.) | 3.0% |
| Resin: | ① Beccacite F-6302 (manufactured by DAINIPPON INK AND CHEMICALS, INC.) | 3.0% |
| Fluorinated surfactant: | perfluoroalkyl group-containing oligomer SC-383 (manufactured by Asahi Glass Co., Ltd.) | 1.0% |

Example 11

| Solvent: | ① propylene glycol methyl ether acetate | 90.0% |
| --- | --- | --- |
| Colorant: | dye Valifast Blue 2606 (manufactured by Orient Chemical Ind. Ltd.) | 2.5% |
| Resin: | ① Beccacite 1120 (manufactured by DAINIPPON INK AND CHEMICALS, INC.) | 2.0% |
| Fluorinated surfactant: | fluorinated alkyl ester FC-171 (manufactured by SUMITOMO 3M LTD.) | 2.5% |
| | perfluoroalkyl group-containing oligomer SC-393 (manufactured by Asahi Glass Co., Ltd.) | 1.0% |

Example 12

| Solvent: | ① propylene glycol methyl ether acetate | 92.8% |
| --- | --- | --- |
| Colorant: | insoluble azo pigment Symuler Fast Red-4081 (manufactured by DAINIPPON INK AND CHEMICALS, INC.) | 2.5% |
| Resin: | ① Solsparce 28,000 (manufactured by ZENECA K.K.) | 1.5% |
| | ② Beccacite 1120 (manufactured by DAINIPPON INK AND CHEMICALS, INC.) | 2.0% |
| Fluorinated surfactant: | perfluoroalkyl group.lipophilic group-containing oligomer EF-352 (manufactured by MITSUBISHI MATERIALS CO.) | 1.2% |

Example 13

| Solvent: | ① propylene glycol methyl ether acetate | 68.0% |
| --- | --- | --- |
| | ② dipropylene glycol monobutyl ether | 21.0% |
| Colorant: | quinacridone pigment Fastogen Super Magenta RTS (manufactured by DAINIPPON INK AND CHEMICALS, INC.) | 3.0% |
| Resin: | ① Solsparce 24,000 GR (manufactured by ZENECA K.K.) | 3.0% |
| Fluorinated surfactant: | fluorinated alkyl ester Florade FC-430 (manufactured | 2.5% |

-continued

| | | |
|---|---|---|
| | by SUMITOMO 3M LTD.) perfluoroalkyl group.lipophilic group-containing oligomer EF-351 (manufactured by MITSUBISHI MATERIALS CO.) | 2.5% |
| Example 14 | | |
| Solvent: | ① propylene glycol methyl ether acetate | 90.5% |
| Colorant: | insoluble azo pigment Symuler Fast Red-4127 (manufactured by DAINIPPON INK AND CHEMICALS, INC.) | 2.5% |
| Resin: | ① carboxyl-modified VCA VMCH (manufactured by UCC Co., Ltd.) | 1.5% |
| Auxiliary solvent: | CO-FA-Butyl (castor oil-modified solvent) (manufactured by Ito Seiyu Co., Ltd.) | 3.0% |
| Fluorinated surfactant: | perfluoroalkyl group-containing oligomer SC-105 (manufactured by Asahi Glass Co., Ltd.) | 2.5% |
| Comparative Example 1 | | |
| Solvent: | ① propylene glycol methyl ether acetate | 65.5% |
| | ① polyoxyethylene secondary alkyl ether | 30.0% |
| Colorant: | insoluble azo pigment Symuler Fast Red-4127 (manufactured by DAINIPPON INK AND CHEMICALS, INC.) | 2.0% |
| Resin: | ① hydroxy-modified VCA VROH (manufactured by UCC Co., Ltd.) | 1.5% |
| Fluorinated surfactant: | perfluoroalkyl group.hydrophilic group-containing oligomer EF-352 (manufactured by MITSUBISHI MATERIALS CO.) | 1.5% |
| Comparative Example 2 | | |
| Solvent: | ① propanol | 92.5% |
| Colorant: | insoluble azo pigment Symuler Fast Red-40152 (manufactured by DAINIPPON INK AND CHEMICALS, INC.) | 3.0% |
| Resin: | ① hydroxy-modified VCA VROH (manufactured by UCC Co., Ltd.) | 2.0% |
| Fluorinated surfactant: | fluorinated alkyl ester Florade FC-430 (manufactured by SUMITOMO 3M LTD.) | 2.5% |
| Comparative Example 3 | | |
| Solvent: | ① propanol | 93.0% |
| Colorant: | quinacridone pigment Fastogen Super Magenta RTS (manufactured by DAINIPPON INK AND CHEMICALS, INC.) | 4.0% |
| Resin: | ① Esleck B BM-1 (manufactured by Sekisui Chemical Co., Ltd.) | 1.5% |
| Fluorinated surfactant: | perfluoroalkyl group.hydrophilic group-containing oligomer EF-352 (manufactured by MITSUBISHI MATERIALS CO.) | 1.5% |
| Comparative Example 4 | | |
| Solvent: | ① dipropylene glycol | 66.5% |
| | ② dipropylene glycol monomethyl ether | 24.5% |
| Colorant: | insoluble azo pigment Symuler Fast Red-4081 (manufactured by DAINIPPON INK AND CHEMICALS, INC.) | 4.0% |
| Resin: | ① hydroxy-modified VCA VROH (manufactured by UCC Co., Ltd.) | 1.5% |
| Fluorinated surfactant: | fluorinated alkyl ester Florade FC-430 (manufactured | 3.5% |

-continued

| | | |
|---|---|---|
| | by SUMITOMO 3M LTD.) | |
| Comparative Example 5 | | |
| Solvent: | ① dipropylene glycol SP = 15.5 | 70.0% |
| | ② dipropylene glycol monomethyl ether | 23.0% |
| Colorant: | insoluble azo pigment Symuler Fast Red-4127 (manufactured by DAINIPPON INK AND CHEMICALS, INC.) | 3.0% |
| Resin: | ① Esleck B BM-1 (manufactured by Sekisui Chemical Co., Ltd.) | 1.0% |
| Fluorinated surfactant: | perfluoroalkyl group.hydrophilic group-containing oligomer EF-352 (manufactured by MITSUBISHI MATERIALS CO.) | 1.5% |
| Comparative Example 6 | | |
| Solvent: | ① dipropylene glycol monobutyl ether | 93.5% |
| Colorant: | dye Valifast Blue 2606 (manufactured by Orient Chemical Ind. Ltd.) | 2.0% |
| Resin: | ① Hilack 110H (manufactured by Hitachi Chemical Co., ltd.) | 3.0% |
| Fluorinated surfactant: | perfluoroalkyl group-containing oligomer S-383 (manufactured by Asahi Glass Co., Ltd.) | 1.5% |
| Comparative Example 7 | | |
| Solvent: | ① dipropylene glycol monobutyl ether | 93.5% |
| Colorant: | dye Valifast Blue 2606 (manufactured by Orient Chemical Ind. Ltd.) | 3.0% |
| Resin: | ① Markide No. 31 (manufactured by Arakawa Chemical Ind. Ltd.) | 3.0% |
| Fluorinated surfactant: | perfluoroalkyl group-containing oligomer S-383 (manufactured by Asahi Glass Co., Ltd.) | 1.5% |
| Comparative Example 8 | | |
| Solvent: | ① propylene glycol methyl ether acetate | 80.0% |
| Colorant: | insoluble azo pigment Symuler Fast Red-4081 (manufactured by DAINIPPON INK AND CHEMICALS, INC.) | 4.0% |
| Resin: | ① acrylic resin MM-404-1 (manufactured by Fujikura Kasei Co., Ltd.) | 4.5% |
| | ② acrylic resin MM-2002-1 (manufactured by Fujikura Kasei Co., Ltd.) | 10.0% |
| Fluorinated surfactant: | perfluoroalkyl group-containing oligomer S-393 (manufactured by Asahi Glass Co., Ltd.) | 1.5% |
| Comparative Example 9 | | |
| Solvent: | ① propylene glycol methyl ether acetate | 61.5% |
| Colorant: | quinacridone pigment Fastogen Super Magenta RTS (manufactured by DAINIPPON INK AND CHEMICALS, INC.) | 26.0% |
| Resin: | ① Solsparce 28,000 (manufactured by ZENECA K.K.) | 10.5% |
| Fluorinated surfactant: | perfluoroalkyl group-containing oligomer S-393 (manufactured by Asahi Glass Co., Ltd.) | 2.0% |
| Comparative Example 10 | | |
| Solvent: | ① propylene glycol ethyl ether acetate | 88.8% |
| Colorant: | insoluble azo pigment Symuler Fast | 5.0% |

-continued

|  | Red-40152 (manufactured by DAINIPPON INK AND CHEMICALS, INC.) | |
|---|---|---|
| Resin: | ① hydroxy-modified VCA VROH (manufactured by UCC Co., Ltd.) | 5.0% |

The inks obtained in Examples 1 to 14 and Comparative Examples 1 to 10 described above were measured for physical property values such as a surface tension, a viscosity and an average particle diameter after dispersing (when the pigments were used) of the ink by the following test methods. Further, the inks prepared, which were charged into pens, were evaluated for drying properties, fastnesses, water resistances and alcohol resistances of the lines drawn on several kinds of writing surfaces. The results thereof are shown in Table 1 and Table 2.

Measurement of surface tension of ink

After preparing the inks, the surface tensions thereof were measured under a condition of 25° C. by means of a CBVP type surface tension meter (produced by Kyowa Interface Science Co., Ltd.) (an average value obtained from three measured values was employed).

Measurement of viscosity of ink

After preparing the inks, the viscosity values were measured at 25° C. and 20 rpm by means of an E type rotary viscometer (produced by TOKIMEC INC.).

Measurement of average particle diameter of pigment inks

After preparing the inks, the average particle diameters were measured by means of a submicron particle sizer (produced by COULTER CORPORATION) (an average value obtained from three measured values was employed).

Measurement of drying property of drawn lines (functional test)

PPC papers were put three minutes after drawing lines on the following various writing surfaces, and a load of 500 g was applied thereon. Then, the drying properties of the drawn lines were evaluated by the degree of stain caused by the inks transferred on the PPC papers.

Writing surfaces: PPC paper surface, plastic surfaces (PS, acryl, PET and ABS), metal surfaces (copper plate, aluminum plate, brass plate and stainless steel plate) and glass surface:

⊚: no stain observed

◯: only a little partial stain observed but not marked

Δ: only a little partial stain observed and marked

X: stain observed in almost all parts

Measurement of fastness of drawn lines (functional test)

One hour after drawing lines on the following various writing surfaces, the drawn lines were rubbed with an applicator, and the fastness of the drawn lines was evaluated by the degree of peeling (rubbing condition: continuously rubbed 10 times).

Writing surfaces: PPC paper surface, plastic surfaces (PS, acryl, PET and ABS), metal surfaces (copper plate, aluminum plate, brass plate and stainless steel plate) and glass surface:

⊚: no peeling observed

◯: only a little partial peeling observed but not marked

Δ: only a little partial peeling observed and marked

X: peeling observed in almost all parts

Measurement of water resistance (functional test)

Lines drawn on PPC paper and coated paper were dipped in water after three hours, and a change in the lines caused after one day was compared with lines which had not been dipped to evaluate the water resistance by the degree of feathering.

⊚: no feathering caused and no reduction in density of lines

◯: only a little feathering caused but a little reduction in density

Δ: only a little feathering caused but marked reduction in density

X: feathering caused to a large extent or heavy reduction in density

Measurement of alcohol resistance (functional test)

Lines drawn on PPC paper and coated paper were swabbed with cloth soaked with ethanol after three hours, and the condition of a change thereof was compared with that of lines which were not swabbed to evaluate the alcohol resistance by the degree of the change.

⊚: almost no reduction in density of lines

◯: only a little reduction in density

Δ: marked reduction in density

X: heavy reduction in density or almost impossible to observe density of lines

Measurement of writability on releasing surface (functional test)

Lines drawn on a kraft tape (a trade name: KP-50 manufactured by MITSUBISHI PENCIL CO., LTD.) were observed to evaluate the writability on a releasing surface by the degree of a change (cissing) in the ink.

⊚: no change observed

◯: a little change (cissing) observed but not marked

X: change (cissing) clearly observed

Measurement of fastness of lines drawn on water-repellent surface (functional test)

Water-repellent spray was applied sufficiently to the whole surface of coated paper and dried for 3 hours, and then lines were written. The lines were swabbed with cloth soaked with alcohol one hour after the writing to evaluate the fastness of the lines drawn on a water-repellent surface by the degree of a change thereof.

⊚: no change observed

◯: a little change (reduction in density) observed but not marked

X: change (reduction in density) clearly observed

TABLE 1

| | Example | | | | | | |
|---|---|---|---|---|---|---|---|
| | 1 | 2 | 3 | 4 | 5 | 6 | 7 |
| Organic solvent | | | | | | | |
| SP value ([cal · cm$^{-3}$]$^{½}$) | | | | | | | |
| ① | 7.5 | 9.6 | 12.0 | 9.6 | 9.6 | 9.6 | 9.6 |
| ② | | | 8.4 | | | | |
| ③ | | | | | | | |
| Vapor pressure (mm Hg) [20° C.] | | | | | | | |
| ① | 1.7 | 3.7 | 0.45 | 3.7 | 3.7 | 3.7 | 3.7 |
| ② | | | 0.4 | | | | |
| ③ | | | | | | | |
| Resin | | | | | | | |

TABLE 1-continued

| | | | | | | | |
|---|---|---|---|---|---|---|---|
| Solubility in water (%) [25° C.] | | | | | | | |
| ① | <1 | <1 | <1 | <1 | <1 | <1 | <1 |
| ② | | | | | | | |
| Solubility in ethanol (%) [25° C.] | | | | | | | |
| ① | <1 | <1 | <1 | <1 | <1 | <1 | <1 |
| ② | | | | | | | |
| Ink surface tension (dyn/cm) | 19.5 | 15.9 | 19.3 | 17.0 | 19.2 | 19.4 | 17.0 |
| Ink viscosity (mPa·s) | 9.2 | 4.9 | 23.6 | 11.0 | 7.6 | 7.0 | 12.2 |
| Average particle diameter (nm) | 285 | 306 | 262 | 179 | 197 | 275 | 401 |
| Line drying property | | | | | | | |
| PPC | ◉ | ◉ | ◉ | ◉ | ◉ | ◉ | ◉ |
| PS | ○ | ◉ | ○ | ◉ | ◉ | ◉ | ◉ |
| Acryl | ○ | ◉ | ○ | ◉ | ◉ | ◉ | ◉ |
| PET | ○ | ◉ | ○ | ◉ | ◉ | ◉ | ◉ |
| ABS | ○ | ◉ | ○ | ◉ | ◉ | ◉ | ◉ |
| Copper plate | ○ | ◉ | ○ | ◉ | ◉ | ◉ | ◉ |
| Aluminum plate | ○ | ◉ | ○ | ◉ | ◉ | ◉ | ◉ |
| Bras plate | ○ | ◉ | ○ | ◉ | ◉ | ◉ | ◉ |
| Stainless steel plate | ○ | ◉ | Δ | ◉ | ◉ | ◉ | ◉ |
| Glass | ○ | ◉ | ○ | ◉ | ◉ | ◉ | ◉ |
| Line fastness | | | | | | | |
| PPC | ◉ | ◉ | ◉ | ◉ | ◉ | ◉ | ◉ |
| PS | ○ | ○ | ○ | ○ | ○ | ○ | ◉ |
| Acryl | ○ | ○ | ○ | ○ | ○ | ○ | ◉ |
| PET | ○ | ○ | ○ | ○ | ○ | ○ | ◉ |
| ABS | ○ | ○ | ○ | ○ | ○ | ○ | ◉ |
| Copper plate | ○ | ○ | ○ | ○ | ○ | ○ | ◉ |
| Aluminum plate | ○ | ○ | ○ | ○ | ○ | ○ | ◉ |
| Bras plate | ○ | ○ | ○ | ○ | ○ | ○ | ◉ |
| Stainless steel plate | ○ | ○ | ○ | ○ | ○ | ○ | ◉ |
| Glass | ○ | ○ | ○ | ○ | ○ | ○ | ◉ |
| Water resistance | | | | | | | |
| PPC | ◉ | ◉ | ◉ | ◉ | ◉ | ◉ | ◉ |
| Coated paper | ◉ | ◉ | ◉ | ◉ | ◉ | ◉ | ◉ |
| Alcohol resistance | | | | | | | |
| PPC | ◉ | ◉ | ◉ | ◉ | ◉ | ◉ | ◉ |
| Coated paper | ◉ | ◉ | ◉ | ◉ | ◉ | ◉ | ◉ |
| Writability on releasing surface Kraft tape | ◉ | ◉ | ◉ | ◉ | ◉ | ◉ | ◉ |
| Fastness of line drawn on water-repellent surface Water repellent treated-coated paper | ◉ | ◉ | ◉ | ◉ | ◉ | ◉ | ◉ |

| | Example | | | | | | |
|---|---|---|---|---|---|---|---|
| | 8 | 9 | 10 | 11 | 12 | 13 | 14 |
| Organic solvent | | | | | | | |
| SP value ([cal·cm$^{-3}$]$^{½}$) | | | | | | | |
| ① | 12.0 | 9.6 | 10.5 | 9.6 | 9.6 | 9.6 | 9.6 |
| ② | | 8.4 | 11.2 | | | 9.9 | |
| ③ | | | 12.2 | | | | |
| Vapor pressure (mm Hg) [20° C.] | | | | | | | |
| ① | 0.45 | 3.7 | 0.01 | 3.7 | 3.7 | 3.7 | 3.7 |
| ② | | 0.4 | 0.6 | | | 0.06 | |
| ③ | | | 9.0 | | | | |
| Resin | | | | | | | |
| Solubility in water (%) [25° C.] | | | | | | | |
| ① | <1 | <3.0 | <1 | <1 | <3.0 | <3.0 | <1 |
| ② | | | | <1 | <1 | | |
| Solubility in ethanol (%) [25° C.) | | | | | | | |
| ① | <1 | <3.5 | <1 | <1 | <4.0 | <3.5 | <1 |
| ② | | | | <1 | <1 | | |
| Ink surface tension (dyn/cm) | 19.9 | 19.6 | 14.7 | 15.3 | 19.2 | 19.5 | 17.1 |
| Ink viscosity (mPa·s) | 18.0 | 14.5 | 8.0 | 6.1 | 7.3 | 7.5 | 4.6 |
| Average particle diameter (nm) | 356 | 310 | — | — | 494 | 313 | 274 |
| Line drying property | | | | | | | |
| PPC | ◉ | ◉ | ◉ | ◉ | ◉ | ◉ | ◉ |
| PS | ○ | ◉ | ○ | ◉ | ◉ | ○ | ◉ |
| Acryl | ○ | ◉ | ○ | ◉ | ◉ | ○ | ◉ |
| PET | ○ | ◉ | Δ | ◉ | ◉ | Δ | ◉ |
| ABS | ○ | ◉ | Δ | ◉ | ◉ | ○ | ◉ |
| Copper plate | ○ | ◉ | Δ | ◉ | ◉ | Δ | ○ |
| Aluminum plate | ○ | ◉ | Δ | ◉ | ◉ | Δ | ○ |
| Bras plate | ○ | ◉ | Δ | ◉ | ◉ | Δ | ○ |
| Stainless steel plate | ○ | ◉ | Δ | ◉ | ◉ | Δ | ○ |
| Glass | ○ | ◉ | Δ | ◉ | ◉ | Δ | ○ |
| Line fastness | | | | | | | |
| PPC | ◉ | ◉ | ◉ | ◉ | ◉ | ◉ | ◉ |
| PS | ◉ | ○ | ○ | ◉ | ◉ | ○ | ○ |
| Acryl | ◉ | ○ | ○ | ◉ | ◉ | ○ | ○ |
| PET | ◉ | ○ | ○ | ◉ | ◉ | ○ | ○ |
| ABS | ◉ | ○ | ○ | ◉ | ◉ | ○ | ○ |
| Copper plate | ◉ | ○ | ○ | ◉ | ◉ | ○ | ○ |
| Aluminum plate | ◉ | ○ | ○ | ◉ | ◉ | ○ | ○ |
| Bras plate | ◉ | ○ | ○ | ◉ | ◉ | ○ | ○ |
| Stainless steel plate | ◉ | ○ | ○ | ◉ | ◉ | ○ | ○ |
| Glass | ◉ | ○ | ○ | ◉ | ◉ | ○ | ○ |
| Water resistance | | | | | | | |
| PPC | ◉ | ◉ | ◉ | ◉ | ◉ | ◉ | ◉ |
| Coated paper | ◉ | ◉ | ◉ | ◉ | ◉ | ◉ | ◉ |
| Alcohol resistance | | | | | | | |
| PPC | ◉ | ◉ | ○ | ○ | ◉ | ◉ | ◉ |
| Coated paper | ◉ | ◉ | ○ | ○ | ◉ | ◉ | ◉ |
| Writability on releasing surface Kraft tape | ◉ | ◉ | ◉ | ◉ | ◉ | ◉ | ◉ |
| Fastness of line drawn on water-repellent surface Water repellent treated-coated paper | ◉ | ◉ | ○ | ○ | ◉ | ◉ | ◉ |

TABLE 2

| | Comparative Example | | | | | | | | | |
|---|---|---|---|---|---|---|---|---|---|---|
| | 1 | 2 | 3 | 4 | 5 | 6 | 7 | 8 | 9 | 10 |
| Organic solvent | | | | | | | | | | |
| SP value ([cal · cm$^{-3}$]$^{½}$) | | | | | | | | | | |
| ① | 9.6 | 12.0 | 12.0 | 15.5 | 15.5 | 9.9 | 9.9 | 9.6 | 9.6 | 7.5 |
| ② | 9.55 | | | | 12.0 | 12.0 | | | | |
| Vapor pressure (mm Hg) [20° C.] | | | | | | | | | | |
| ① | 3.7 | 14.5 | 14.5 | under 0.01 | under 0.01 | 0.06 | 0.06 | 3.7 | 3.7 | 1.7 |
| ② | under 0.01 | | | 0.45 | 0.45 | | | | | |
| Resin | | | | | | | | | | |
| Solubility in water (%) [25° C.] | | | | | | | | | | |
| ① | <1 | <1 | <2 | <1 | <2 | <2 | <2 | <1 | <3.0 | <1 |
| ② | | | | | | | | <1 | | |
| Solubility in ethanol (%) [25° C.] | | | | | | | | | | |
| ① | <1 | <1 | 10< | <1 | 10< | 10< | 10< | <1 | <4.0 | <1 |
| ② | | | | | | | | <1 | | |
| Ink surface tension (dyn/cm) | 19.3 | | 18.9 | | 20.8 | 15.7 | 15.8 | 15.4 | 15.3 | 28.2 |
| Ink viscosity (mPa · s) | 18.6 | | 8.5 | | 45.2 | 9.0 | 9.6 | 149 | 93.3 | 8.9 |
| Average particle diameter (nm) | 452 | | 365 | | 447 | — | — | 451 | 406 | 281 |
| Line drying property | | | | | | | | | | |
| PPC | ◎ | *1 | ◎ | *1 | ◎ | ◎ | ◎ | *2 | *2 | ◎ |
| PS | △ | | ◎ | | △ | ○ | ○ | | | ○ |
| Acryl | △ | | ◎ | | △ | △ | △ | | | ○ |
| PET | X | | ◎ | | X | △ | △ | | | ○ |
| ABS | X | | ◎ | | X | △ | △ | | | ○ |
| Copper plate | X | | ◎ | | X | △ | △ | | | ○ |
| Aluminum plate | X | | ◎ | | X | △ | △ | | | ○ |
| Bras plate | X | | ◎ | | X | △ | △ | | | ○ |
| Stainless steel plate | X | | ◎ | | X | △ | △ | | | ○ |
| Glass | X | | ◎ | | X | △ | △ | | | ○ |
| Line fastness | | | | | | | | | | |
| PPC | ◎ | | ◎ | | ◎ | ◎ | ◎ | | | ◎ |
| PS | X | | ◎ | | △ | ○ | ○ | | | ○ |
| Acryl | X | | ◎ | | X | ○ | ○ | | | ○ |
| PET | X | | ◎ | | X | ○ | ○ | | | ○ |
| ABS | X | | ◎ | | X | ○ | ○ | | | ○ |
| Copper plate | X | | ◎ | | X | ○ | ○ | | | ○ |
| Aluminum plate | X | | ◎ | | X | ○ | ○ | | | ○ |
| Bras plate | X | | ◎ | | X | ○ | ○ | | | ○ |
| Stainless steel plate | X | | ◎ | | X | ○ | ○ | | | ○ |
| Glass | X | | ◎ | | X | ○ | ○ | | | ○ |
| Water resistance | | | | | | | | | | |
| PPC | ◎ | | △ | | △ | X | X | | | ◎ |
| Coated paper | ◎ | | X | | X | X | X | | | ◎ |
| Alcohol resistance | | | | | | | | | | |
| PPC | ◎ | | △ | | △ | X | X | | | ◎ |
| Coated paper | ◎ | | X | | X | X | X | | | ◎ |
| Writability on releasing surface Kraft tape | ◎ | | ◎ | | ◎ | ○ | ○ | | | X |
| Fastness of line drawn on water-repellent surface Water repellent treated-coated paper | ◎ | | X | | X | X | X | | | △ |

*1 pigment-dispersed ink could not be obtained
*2 pen charged with the ink could not discharge the sufficient amount of the ink and therefore could not be evaluated Comments on Results Shown in Table 1 and Table 2

As apparent from the results summarized in Table 1 and Table 2, it has become clear that the ink compositions prepared in Examples 1 to 14 falling in the scope of the present invention are very excellent in writing performances including a drying property and a fastness, a water resistance, an alcohol resistance, a writability on a releasing surface and a fastness in writing on a water-repellent surface as compared with Comparative Examples 1 to 10 falling outside the scope of the present invention.

Observing the individual cases, the ink compositions prepared in Examples 1 to 14 using the solvents having a high vapor pressure regardless of the colorants are advantageous in terms of a drying property of the drawn lines. It can be found that the fastness of the drawn lines is influenced particularly by the kind of the resins and that the resins forming a strong film on the drawn lines and having a good adhesion to a writing surface provide the drawn lines with an excellent fastness. Further, it has been able to be confirmed that the water resistances and the alcohol resistances are better as the solubilities of the resins are better and as the pigments are used as the colorants, and that when the dyes are used as the colorants, the dyes are dispersed in alcohol while the solubilities thereof are inferior.

Further, it has been confirmed that the fluorinated surfactants falling in the range of the present invention are indispensable to the writability on a releasing surface and that the fluorinated surfactants and the resins having less solubility in ethanol are indispensable to a fastness of lines drawn on a water repellent surface.

According to the present invention, provided is the ink composition for writing instruments which can write on various writing surfaces such as a resin surface, a glass surface and a metal surface and is excellent in a line sticking property against non-absorbing surfaces, a water resistance and an alcohol resistance and which can certainly write even on writing surfaces having a releasing property or a water-repellent property and provides drawn lines which are not erased with water and alcohol.

What is claimed is:

1. An ink composition for writing instruments, which comprises an organic solvent selected from the grout consisting of glycol ethers, glycol ether acetates, esters, and derivatives thereof, having an SP value of 5 to 15 and a vapor pressure of 0.01 to 45 mmHg at 20° C., a colorant consisting of a pigment and/or a dye, a resin having a solubility of 7% or less in water or ethanol at 25° C. and a fluorinated surfactant selected from the group consisting of surfactants having perfluoralkyl groups or fluorinated alkyl groups and oligomers thereof.

2. The ink composition for writing instruments according to claim 1, wherein said resin having a solubility of 7% or less in water or ethanol is at least one selected from the group consisting of a vinyl resin and a modified vinyl resin thereof, an acrylic resin and a fluorinated resin.

3. The ink composition for writing instruments according to claim 2, wherein the ink has a viscosity of 1 to 60 mPa.s and a surface tension of 13 to 40 dyn/cm.

4. The ink composition for writing instruments according to claim 1, wherein the ink has a viscosity of 1 to 60 mPa.s and a surface tension of 13 to 40 dyn/cm.

* * * * *